(12) United States Patent
Smit et al.

(10) Patent No.: US 7,225,088 B2
(45) Date of Patent: May 29, 2007

(54) PROGRAMMABLE POWER SUPPLY AND BROWNOUT DETECTOR FOR ELECTRONIC EQUIPMENT

(75) Inventors: Willem Smit, Chandler, AZ (US); Theodor Johannes Dippenaar, Issaquah, WA (US); Pieter Schieke, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 503 days.

(21) Appl. No.: 10/368,307

(22) Filed: Feb. 17, 2003

(65) Prior Publication Data

US 2003/0191596 A1    Oct. 9, 2003

Related U.S. Application Data

(63) Continuation-in-part of application No. 09/977,652, filed on Oct. 15, 2001, now Pat. No. 6,522,981, which is a continuation of application No. 09/154,016, filed on Sep. 16, 1998, now Pat. No. 6,304,823.

(51) Int. Cl.
*G01R 21/00*    (2006.01)
*G01R 21/06*    (2006.01)

(52) U.S. Cl. ....................................... 702/60

(58) Field of Classification Search ................. 702/60, 702/182, 183; 323/304, 308, 299
See application file for complete search history.

(56) References Cited

U.S. PATENT DOCUMENTS

| | | | |
|---|---|---|---|
| 4,567,539 A | 1/1986 | Sinberg | |
| 4,713,553 A | 12/1987 | Townsend et al. | |
| 5,235,980 A * | 8/1993 | Varrichio et al. | 607/60 |
| 5,355,077 A * | 10/1994 | Kates | 323/224 |
| 5,363,288 A | 11/1994 | Castell et al. | |
| 5,606,511 A | 2/1997 | Yach | |
| 5,737,616 A | 4/1998 | Watanabe | |
| 5,781,448 A | 7/1998 | Nakamura | |
| 5,825,674 A | 10/1998 | Jackson | |
| 5,828,822 A | 10/1998 | Ernst | |
| 5,847,950 A * | 12/1998 | Bhagwat | 363/78 |
| 5,852,737 A | 12/1998 | Bikowsky | |
| 5,859,768 A * | 1/1999 | Hall et al. | 363/21.13 |
| 5,943,635 A * | 8/1999 | Inn | 702/60 |
| 6,009,022 A | 12/1999 | Lee et al. | |
| 6,097,628 A | 8/2000 | Rolandi | |
| 6,107,985 A | 8/2000 | Walukas et al. | |
| 6,177,785 B1 | 1/2001 | Lee | |
| 6,304,823 B1 * | 10/2001 | Smit et al. | 702/60 |
| 6,522,981 B2 * | 2/2003 | Smit et al. | 702/60 |

* cited by examiner

*Primary Examiner*—Bryan Bui
*Assistant Examiner*—Demetrius Pretlow
(74) *Attorney, Agent, or Firm*—Baker Botts L.L.P.

(57) ABSTRACT

A programmable power supply and brownout detector for electronic equipment features independent, but coordinated, control of operating voltage and brownout reference voltage. Improper programming of the operating voltage and the brownout reference voltage levels is prevented. The threshold of the programmable power supply and brownout detector can also be controlled to provide an optimum threshold over a range of operating voltages.

35 Claims, 2 Drawing Sheets

PROGRAMMABLE POWER SUPPLY AND BROWNOUT DETECTOR FOR ELECTRONIC EQUIPMENT

RELATED PATENTS

This application is a continuation-in-part of commonly owned U.S. patent application Ser. No. 09/997,652, filed Oct. 15, 2001 now U.S. Pat. No. 6,522,981, issued Feb. 18, 2003, which is a continuation of commonly owned U.S. patent application Ser. No. 09/154,016 filed Sep. 16, 1998, now U.S. Pat No. 6,304,823, issued Oct. 16, 2001, both are hereby incorporated by reference herein for all purposes.

FIELD OF THE INVENTION

This invention relates generally to power supplies for electronic equipment, and more specifically, to a power supply system having a programmable power supply and a programmable brownout detector which can be set to track the power supply output. The programmable power supply and the programmable brownout detector are independently controlled by a common, intelligent control unit. The control unit may also disable the programmable brownout detector.

BACKGROUND OF THE INVENTION TECHNOLOGY

Programmable power supplies and brownout detectors for electronic equipment, i.e., both digital and analog, are known in the art. The use of electronic equipment in high reliability applications has created the need to change operating voltages to reduce current consumption for low power and battery powered applications. A need also exists to detect when the operating voltage drops below a predetermined level for reliability considerations.

A brownout is considered to have occurred when the incoming voltage available to the electronic equipment has dropped to a level where the electronic circuits should not continue operating, since errors or partly functional conditions may occur in case of digital circuit logic or storage elements. The brownout ends when the voltage has risen back above the brownout level. A hysteresis or latching scheme can be used to prevent oscillation at the brownout level. A brownout detector detects when the operating voltage has dropped to just above the brownout voltage level and produces a signal to indicate to the electronic equipment that a brownout is pending. The brownout detector can reset or freeze the operation of the electronic equipment to avoid improper operation.

In a practical application, the electronic equipment must be protected against brownout conditions that can cause digital logic to enter unknown states and thereby corrupt the operation of the electronic equipment, and/or analog circuit latch-up or saturation conditions. In the existing state of the art, these power supplies and brownout detectors are either not linked in operation at all, or are linked only by virtue of the reference voltage to the brownout detector being related directly to the operating voltage to the electronic equipment. Also there is no provision for lowering the operating voltage of the electronic equipment during sleep mode to reduce current consumption.

SUMMARY OF THE INVENTION

The invention overcomes the above-identified problems as well as other shortcomings and deficiencies of existing technologies by providing a programmable brownout detector and a programmable power supply for increasing the reliability of electronic equipment. The present invention improves upon past techniques by providing a programmable power supply which can lower the operating voltage during sleep mode or as the application otherwise requires and a programmable brownout detector which can intelligently relate the operating voltage to a brownout level. This prevents improper operation due to the brownout level being set too high by an improper instruction, firmware error, latch-up or saturation condition. The present invention also allows for an operational interrelationship between the operating voltage reference and the brownout detector threshold. Electronic equipment may comprise digital and/or analog circuits, e.g., microcontroller, microprocessor, digital signal processor, digital signal controller, application specific integrated circuit, programmable logic array, digital monitoring devices, analog and digital sensors, programmable gain amplifier, multiplexer, analog-to-digital converter, digital-to-analog converter, volatile and non-volatile memory storage devices, etc.

In accordance with an exemplary embodiment of the present invention, a programmable power supply and a programmable brownout detector are provided. The power supply and the brownout detector are programmed by a control unit, which allows the brownout voltage and operating voltage to be varied independently.

In accordance with another embodiment of the present invention, a programmable power supply and a programmable brownout detector are provided where they are both programmed by a control unit and the control unit prevents improper programming by firmware or operating failures.

In accordance with still another embodiment of the present invention, a programmable power supply and a programmable brownout detector are provided wherein they are programmed by a control unit and the control unit relates the operating voltage to the brownout level so as to optimize operation of the brownout detector.

In accordance with yet another embodiment of the present invention, a programmable power supply is provided wherein the operating voltage is lowered during sleep mode to reduce power consumption in sleep mode.

A technical advantage of the present invention is that the programmable brownout detector cannot be programmed to detect an incorrect or undesired brownout level for a given operating voltage. A technical feature of the present invention is a system which allows a programmable brownout detector to have a threshold optimally determined over a range of operating voltages which are programmable. Still another technical feature of the present invention is a system which reduces the operating voltage to electronic circuits of the electronic equipment during a sleep mode to reduce power consumption thereof.

Features and advantages of the invention will be apparent from the following detailed description of exemplary embodiments, given for the purpose of disclosure and taken in conjunction with the accompanying drawing.

BRIEF DESCRIPTION OF THE DRAWING

A more complete understanding of the present disclosure and advantages thereof may be acquired by referring to the following description taken in conjunction with the accompanying drawing, wherein.

Figure 1:
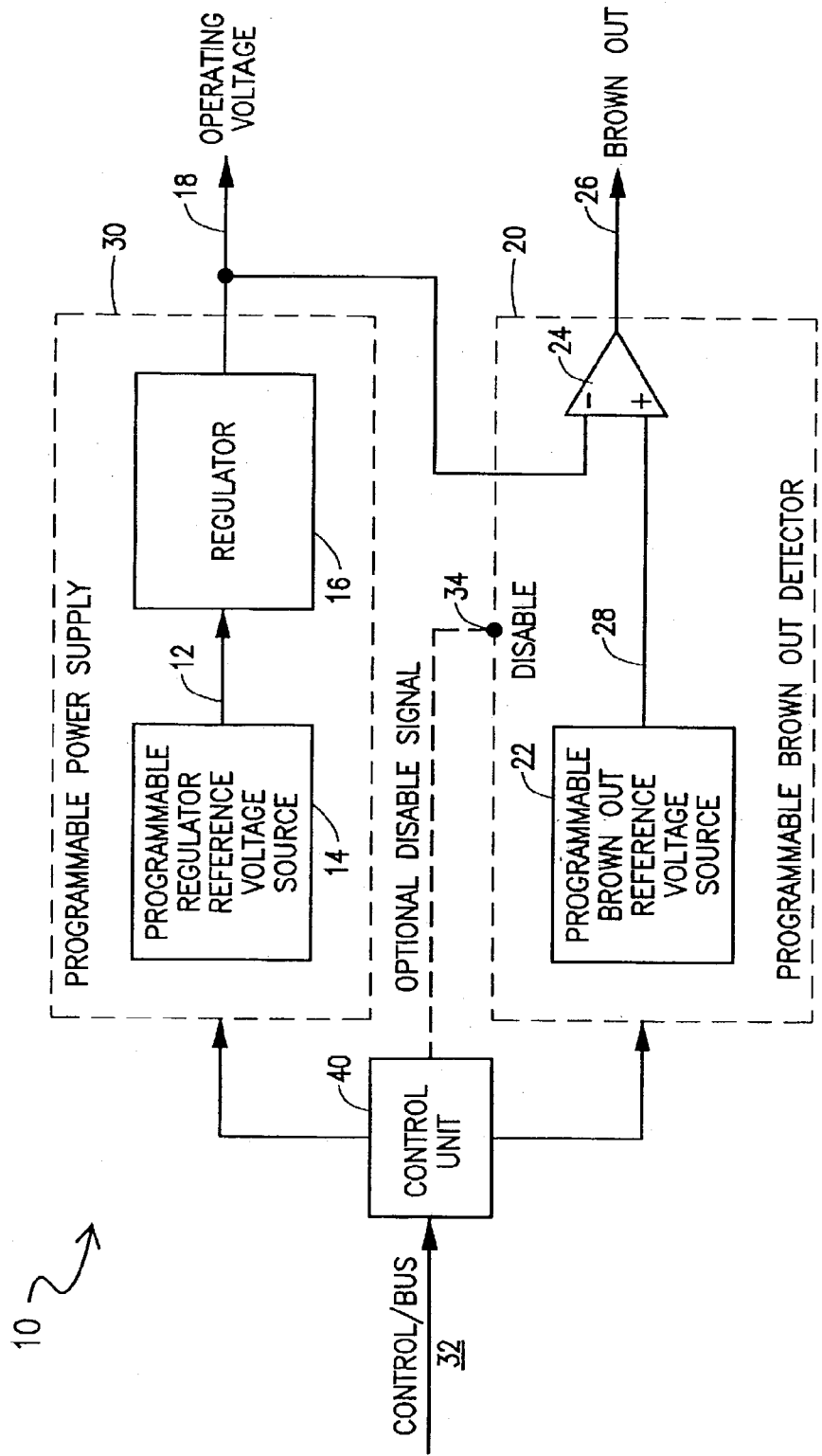
FIG. 1 is a simplified electrical diagram of the programmable power supply and programmable brownout detector.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Referring now to the drawings, the details of exemplary embodiments of the present invention are schematically illustrated. Like elements in the drawing will be represented by like numbers, and similar elements will be represented by like numbers with a different lower case letter suffix.

It is contemplated and within the scope of the present invention that the programmable power supply and a programmable brownout detector power described and claimed herein may be adapted for any type of electronic equipment comprising digital and/or analog circuits, e.g., microcontroller, microprocessor, digital signal processor, digital signal controller, application specific integrated circuit, programmable logic array, digital monitoring devices, analog and digital sensors, programmable gain amplifier, multiplexer, analog-to-digital converter, digital-to-analog converter, volatile and non-volatile memory storage devices, etc.

Referring to FIG. 1, depicted is a power supply system for electronic equipment, generally represented by the numeral 10. The power supply system 10 comprises a programmable power supply 30, a programmable brownout detector 20 and a control unit 40. The programmable power supply 30 comprises a programmable regulator reference voltage source 14 and a regulator 16.

Figure 2:
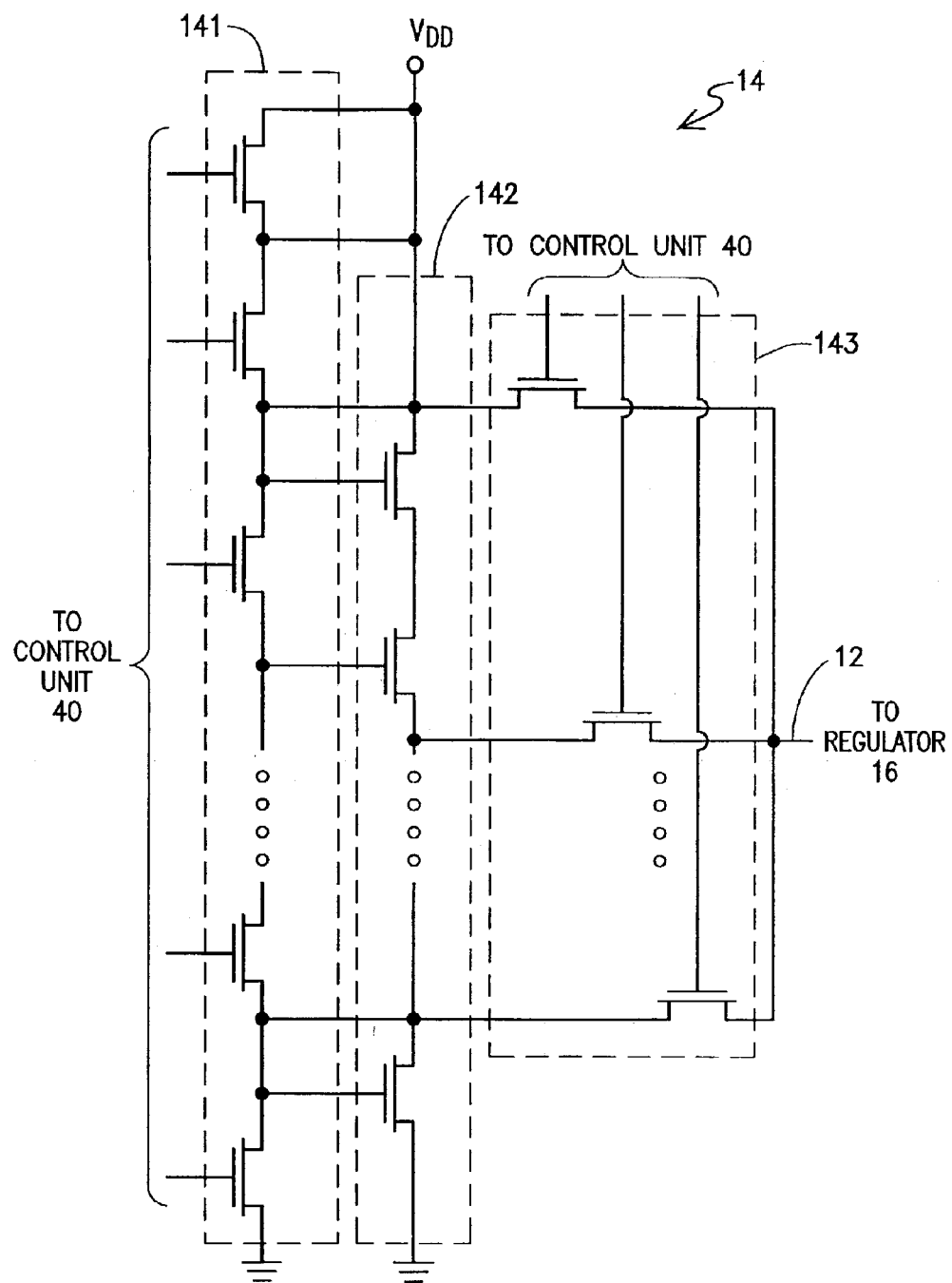
FIG. 2 is a schematic diagram of a programmable voltage divider network.

Referring to FIG. 2, wherein like numerals reflect like elements, the programmable regulator reference voltage source 14 can be implemented as a chain of linear or non-linear resistors or resistive devices 142 and are shown as MOS transistors. These resistive devices 142 may be either shunted or selected by a chain of analog switches 141. The desired voltage, division may be selected by a second chain of analog switches 143 to provide a regulator reference voltage 12 selected from a variety of options. The control unit 40 would select a discrete regulator reference voltage 12 by controlling the selection of switches 141 and 143. The programmable regulator reference voltage source 14 thus is a programmable voltage divider chain or network.

Referring back to FIG. 1, the regulator 16 acts as a buffer for the regulator reference voltage 12 to provide the current levels needed at the operating voltage output 18. This operating voltage output 18 provides the operating power for the electronic equipment. The programmable brownout detector 20 comprises a programmable brownout reference voltage source 22 and a comparator 24. The comparator 24 compares the brownout reference voltage 28, provided by the programmable brownout reference voltage source 22, to the operating voltage output 18. When the operating voltage output 18 voltage drops below the brownout reference voltage 28, a brownout condition has occurred. The brownout signal output 26 is activated to indicate to the electronic equipment that the electronic circuits of the electronic equipment should take action to prevent invalid operation as a result of operating voltage decay. The programmable brownout reference voltage source 22 can be implemented similar to the programmable voltage divider as described in FIG. 2 for the programmable regulator reference voltage source 14. In general, the brownout reference voltage 28 preferably may be a fraction of the operating voltage output 18.

The control unit 40 provides the digital interface from the control bus 32 to the programmable regulator reference voltage source 14 and the programmable brownout reference voltage source 22. The control unit 40 contains logic to prevent setting invalid combinations as between the operating voltage output 18 and the brownout reference voltage 28, e.g., brownout reference voltage 28 greater than the operating voltage output 18. Thus, the control unit 40 prevents invalid voltage settings due to improper operation of the electronics or invalid programming instructions by coordinating operating voltage 18 with brownout reference voltage 28. Furthermore, the control unit 40 may provide an optional disable signal 34 which will disable the programmable brownout detector 20 from operation. The optional disable signal 34 may also be programmable.

The control unit 40 supplies the control input to the programmable brownout reference voltage source 22. The control unit 40 also contains logic to ensure that the brownout reference voltage 28 does not exceed the level of the operating voltage output 18. Those skilled in the art will recognize that these types of control functions can be implemented by a state machine or other types of combinational and sequential digital logic. Thus, the function of the control unit 40 can be extended to control the range of the brownout reference voltage 28 in any fashion necessary to protect the electronic equipment from invalid operating voltages. In one embodiment, using analog switches for the programmable brownout reference voltage source 22 and the programmable regulator reference voltage source 14, the control unit 40 can set the state of the analog switches in the programmable brownout reference voltage source 22 based on the state of the switches in the programmable regulator reference voltage source 14. For example, the control unit 40 can close the analog switches in the programmable brownout reference voltage source 22 if a corresponding switch in the programmable regulator reference voltage source 14 is closed, ensuring the brownout reference voltage 28 will never exceed the regulator reference voltage 12.

The invention, therefore, is well adapted to carry out the objects and attain the ends and advantages mentioned, as well as others inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An electronic equipment power supply system comprising:
   a programmable power supply for supplying power to electronic circuits of electronic equipment;
   a programmable brownout detector coupled to said programmable power supply for detecting when a operating voltage drops below a brownout reference voltage and for further providing a brownout signal output; and a control unit coupled to said programmable power supply and further coupled to said programmable brownout detector for setting said operating voltage and further setting said brownout reference voltage.

2. The electronic equipment power supply system according to claim 1, wherein said control unit sets said brownout reference voltage not to exceed a fixed fraction of said operating voltage.

3. The electronic equipment power supply system according to claim 1, wherein said control unit can disable the operation of said programmable brownout detector.

4. The electronic equipment power supply system according to claim 1, wherein said programmable brownout detector comprises:
   a programmable brownout reference voltage source for setting said brownout reference voltage; and
   a comparator coupled to said programmable brownout reference voltage source and for providing said brownout signal output.

5. The electronic equipment power supply system according to claim 1, wherein said programmable power supply comprises:
   a programmable regulator reference voltage source for setting a regulator reference voltage; and
   a regulator coupled to said programmable regulator reference voltage source for buffering said regulator reference voltage.

6. The electronic equipment power supply system according to claim 1, wherein said programmable power supply comprises:
   a voltage divider network for producing a plurality of regulator reference voltages; and
   a regulator coupled to said voltage divider network for providing said operating voltage;
   said control unit having at least one output coupled to said voltage divider network for selecting discrete values of said plurality of regulator reference voltages.

7. The electronic equipment power supply system according to claim 1, further comprising:
   a voltage divider network for producing a plurality of brownout reference voltages, and
   said control unit having at least one output coupled to said voltage divider network for selecting discrete values of said plurality of brownout reference voltages.

8. The electronic equipment power supply system according to claim 7, wherein said programmable power supply comprises:
   a second voltage divider network for producing a plurality of regulator reference voltages; and
   a regulator coupled to said second voltage divider network for providing said operating voltage;
   said control unit having at least one second output coupled to said second voltage divider network for selecting discrete values of said plurality of regulator reference voltages.

9. The electronic equipment power supply system according to claim 1, wherein said control unit changes said brownout reference voltage based on the setting of said operating voltage.

10. The electronic equipment power supply system according to claim 9, wherein said control unit sets said brownout reference voltage to not exceed a fixed fraction of said operating voltage.

11. The electronic equipment power supply system according to claim 9, wherein said control unit can disable the operation of said programmable brownout detector.

12. The electronic equipment power supply system according to claim 9, wherein said programmable power supply comprises:
    a programmable regulator reference voltage source for setting a regulator reference voltage of said programmable regulator reference voltage source; and
    a regulator coupled to said programmable regulator reference voltage source for buffering said regulator reference voltage.

13. The electronic equipment power supply system according to claim 9, wherein said, programmable power supply comprises:
    a voltage divider network for producing a plurality of regulator reference voltages; and
    a regulator coupled to said voltage divider network for providing said operating voltage;
    said control unit having at least one output coupled to said voltage divider network for selecting discrete values of said plurality of regulator reference voltages.

14. The electronic equipment power supply system according to claim 9, further comprising:
    a voltage divider network for producing a plurality of brownout reference voltages;
    said control unit having at least one output coupled to said voltage divider network for selecting discrete values of said plurality of brownout reference voltages.

15. The electronic equipment power supply system according to claim 14, wherein said programmable power supply comprises:
    a second voltage divider network for producing a plurality of regulator reference voltages; and
    a regulator coupled to said second voltage divider network for providing said operating voltage;
    said control unit having at least one second output coupled to said second voltage divider network for selecting discrete values of said plurality of regulator reference voltages.

16. The electronic equipment power supply system according to claim 1, wherein electronic equipment is selected from the group consisting of microcontroller, microprocessor, digital signal processor, digital signal controller, application specific integrated circuit, programmable logic array, digital monitoring devices, analog and digital sensors, programmable gain amplifier, multiplexer, analog-to-digital converter, digital-to-analog converter, and volatile and non-volatile memory storage devices.

17. A method for controlling an electronic equipment power supply, said method comprising the steps of:
    providing a programmable power supply for supplying an operating voltage to electronic circuits of electronic equipment;
    detecting when the operating voltage drops below a brownout reference voltage with a programmable brownout detector, the programmable brownout detector being coupled to the programmable power supply;
    providing a brownout signal output from the programmable brownout detector;
    setting the operating voltage with a control unit, the control unit being coupled to the programmable power supply; and
    setting the brownout reference voltage with the control unit, the control unit being coupled to the programmable brownout detector.

18. The method according to claim 17, wherein the step of setting the brownout reference voltage includes the step of not exceeding a fixed fraction of the operating voltage.

19. The method according to claim 17, further comprising the step of disabling operation of the programmable brownout detector with the control unit.

20. The method according to claim 17, wherein:
the step of detecting when the operating voltage drops below the brownout reference voltage further comprises the step of setting the brownout reference voltage with a programmable brownout reference voltage source; and
the step of providing the brownout signal output further comprises the step of providing the brownout signal output from a comparator coupled to the programmable brownout reference voltage source.

21. The method according to claim 17, wherein the step of providing a programmable power supply comprises the steps of:
setting a regulator reference voltage as a programmable regulator reference voltage source; and
buffering the regulator reference voltage with a regulator coupled to the programmable regulator reference voltage source.

22. The method according to claim 17, wherein the step of providing a programmable power supply comprises the steps of:
producing a plurality of regulator reference voltages with a voltage divider network;
providing the operating voltage from a regulator coupled to the voltage divider network; and
selecting discrete values of the plurality of regulator reference voltages with the control unit, the control unit having at least one output coupled to the voltage divider network.

23. The method according to claim 17, further comprising the steps of:
producing a plurality of brownout reference voltages with a voltage divider network; and
selecting discrete values of the plurality of brownout reference voltages with the control unit, the control unit having at least one output coupled to the voltage divider network.

24. The method according to claim 23, further comprising the steps of:
producing a plurality of regulator reference voltages with a second voltage divider network;
providing the operating voltage from a regulator coupled to the second voltage divider network; and
selecting discrete values of the plurality of regulator reference voltages with the control unit, the control unit having at least one second output coupled to the second voltage divider network.

25. The method according to claim 17, further comprising the step of changing the brownout reference voltage based on the setting of the operating voltage.

26. The method according to claim 25, further comprising the step of settings the brownout reference voltage so as not to exceed a fixed fraction of the operating voltage.

27. The method according to claim 25, further comprising the step of disabling operation of the programmable brownout detector with the control unit.

28. The method according to claim 25, wherein the step of providing a programmable power supply comprises the steps of:
setting a regulator reference voltage of the programmable regulator reference voltage source with a programmable regulator reference voltage source; and
buffering the regulator reference voltage with a regulator coupled to the programmable regulator reference voltage source.

29. The method according to claim 25, wherein the step of providing a programmable power supply comprises the steps of:
producing a plurality of regulator reference voltages with a voltage divider network;
providing the operating voltage from a regulator coupled to the voltage divider network; and
selecting discrete values of the plurality of regulator reference voltages with the control unit, the control unit having at least one output coupled to the voltage divider network.

30. The method according to claim 25, further comprising the steps of:
producing a plurality of brownout reference voltages with a voltage divider network; and
selecting discrete values of the plurality of brownout reference voltages with the control unit, the control unit having at least one output coupled to the voltage divider network.

31. The method according to claim 30, further comprising the steps of:
producing a plurality of regulator reference voltages with a second voltage divider network;
providing the operating voltage from a regulator coupled to the second voltage divider network; and
selecting discrete values of the plurality of regulator reference voltages with the control unit, the control unit having at least one second output coupled to the second voltage divider network.

32. The method according to claim 17, wherein electronic equipment is selected from the group consisting of microcontroller, microprocessor, digital signal processor, digital signal controller, application specific integrated circuit, programmable logic array, digital monitoring devices, analog and digital sensors, programmable gain amplifier, multiplexer, analog-to-digital converter, digital-to-analog converter, and volatile and non-volatile memory storage devices.

33. A method for controlling an electronic equipment power supply, said method comprising the steps of:
supplying an operating voltage to a microprocessor from a programmable power supply;
controlling the operating voltage with a control unit coupled to the programmable power supply, wherein the operating voltage is reduced when the microprocessor enters a sleep mode;
producing a plurality of regulator reference voltages with a voltage divider network;
providing the operating voltage from a regulator coupled to the voltage divider network; and
selecting discrete values of the plurality of regulator reference voltages with the control unit, the control unit having at least one output coupled to the voltage divider network.

34. A method for controlling an electronic equipment power supply, said method comprising the steps of:
supplying an operating voltage to a microprocessor from a programmable power supply;
controlling the operating voltage with a control unit coupled to the programmable power supply, wherein the operating voltage is reduced when the microprocessor enters a sleep mode; and providing a brownout signal output with a programmable brownout detector, wherein the programmable brownout detector comprises a programmable brownout reference voltage source and a comparator having a first input coupled to a brownout reference voltage from the programmable brownout reference voltage source and a second input coupled to the operating voltage;

wherein the programmable brownout reference voltage is coupled to the control unit and the control unit controls the brownout reference voltage from the programmable brownout reference voltage source.

35. The method according to claim 34, further comprising the step of disabling the programmable brownout detector with the control unit.

* * * * *